United States Patent Office 2,973,049
Patented Feb. 28, 1961

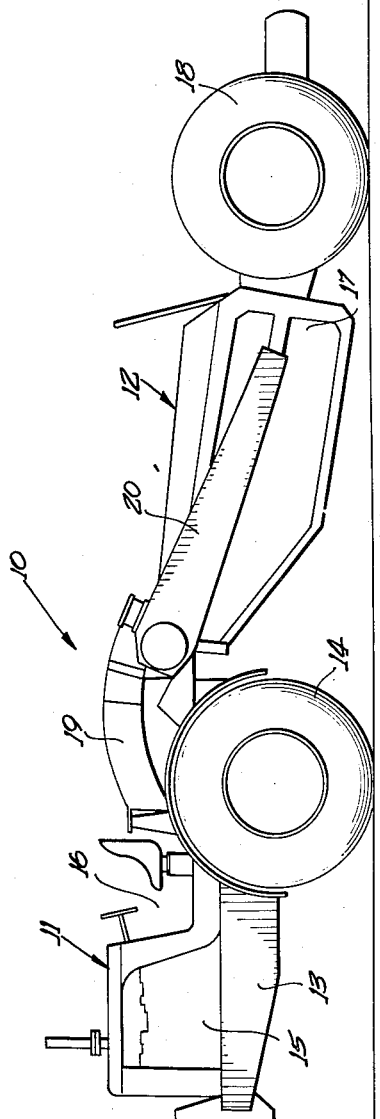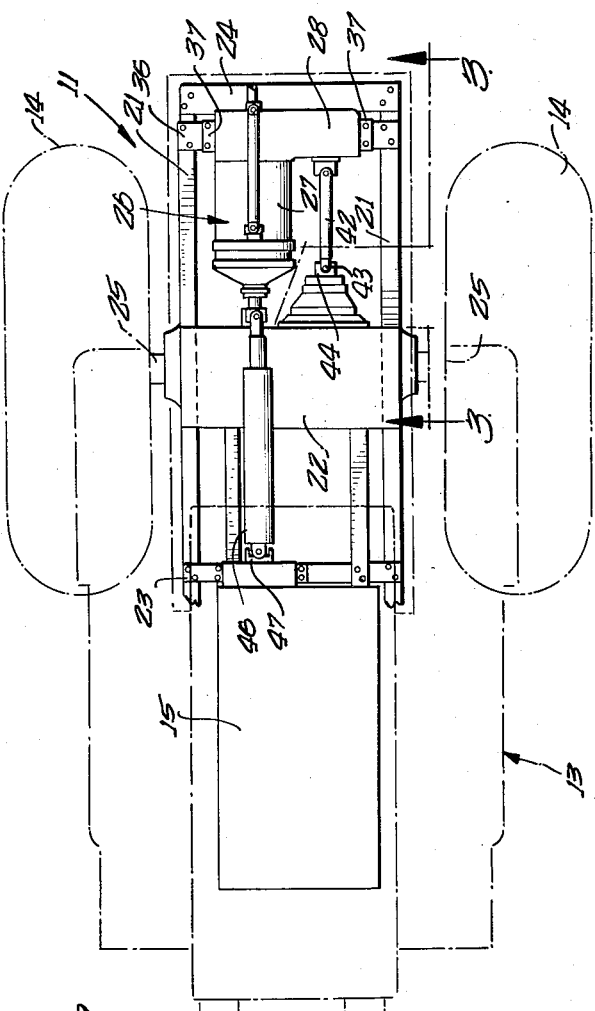

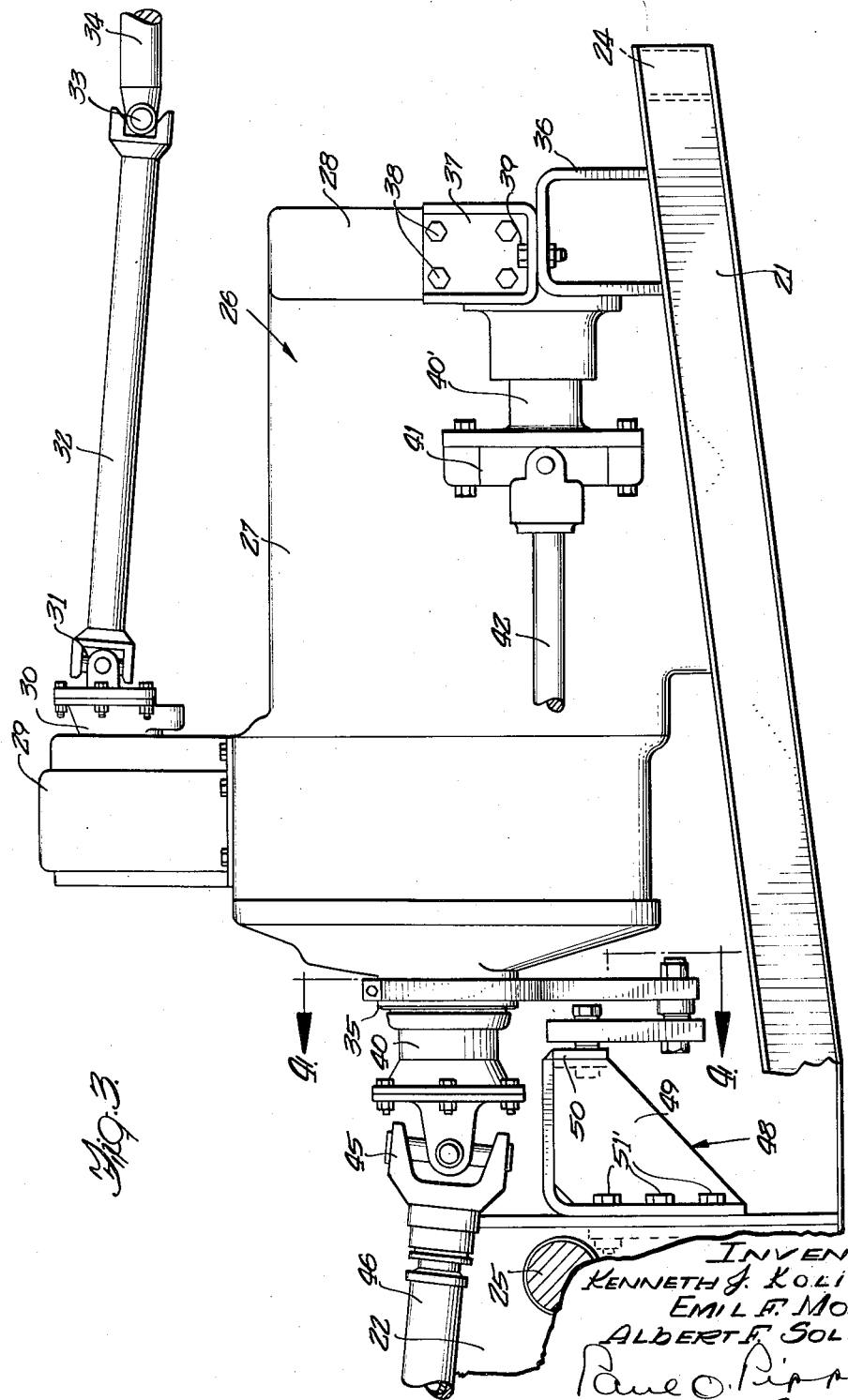

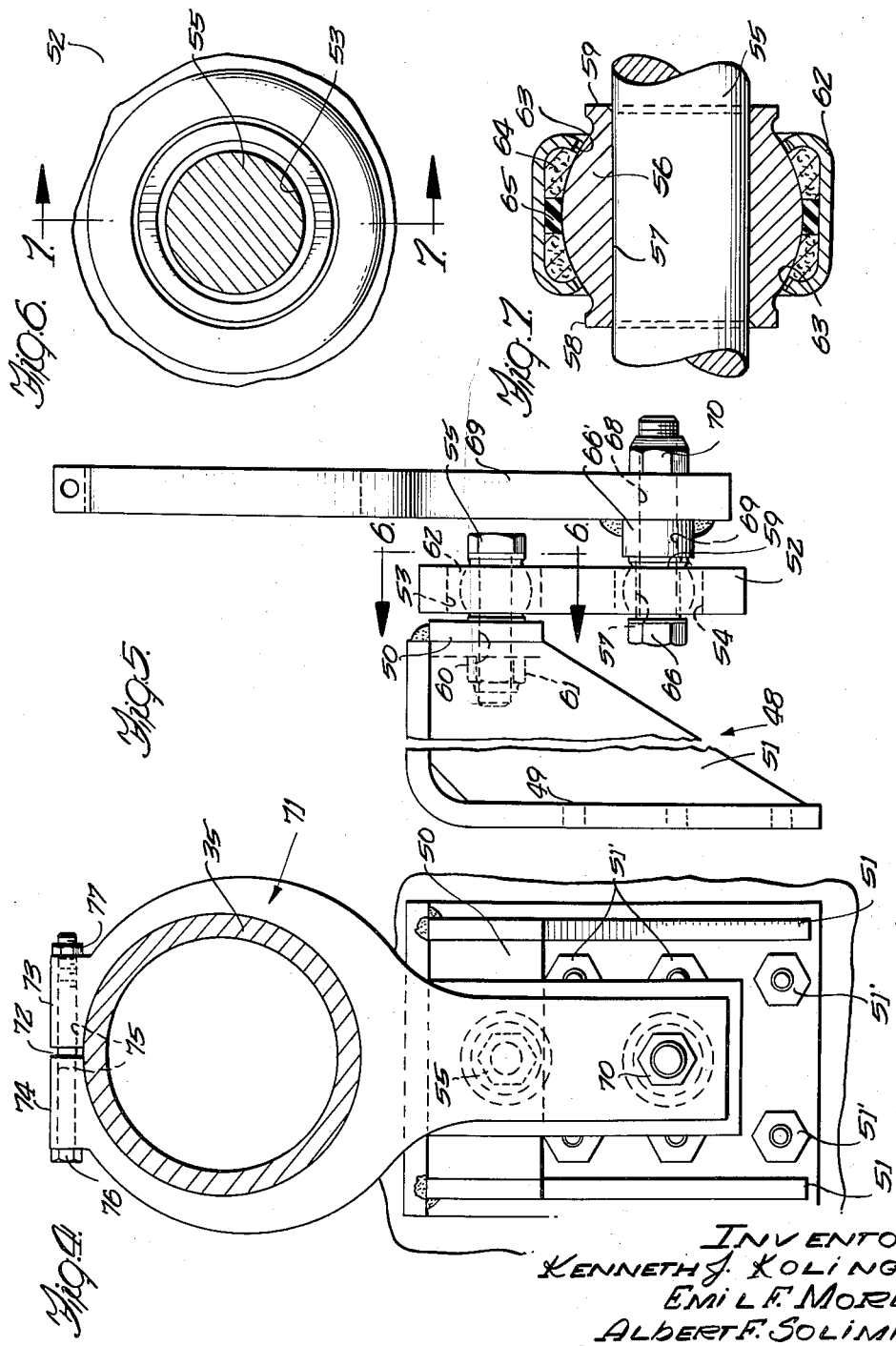

---

2,973,049

TRANSMISSION MOUNTING MEANS FOR VEHICLES

Kenneth J. Kolinger, Riverside, Emil F. Moreno, Melrose Park, and Albert F. Solimine, Carpentersville, Ill., assignors to International Harvester Company, Chicago, Ill., a corporation of New Jersey Filed July 6, 1959, Ser. No. 824,994

6 Claims. (Cl. 180—70)

This invention relates to a vehicle and more particularly to a vehicle of the type utilized in earth moving operations. More specifically the invention relates to a transmission mount for a two wheel tractor vehicle.

It is a prime object of this invention to provide an improved transmission mounting means for supporting a transmission upon the frame of a two wheel tractor utilized in connection with earth moving operations.

Another object is to provide an improved transmission mounting means adapted to be supported between a pair of transversely spaced frame members, said mounting means permitting a limited amount of flexible movement during operation of the vehicle wherein the frame is subject to flexing and twisting incidental to the terrain over which the vehicle is operated.

A still more specific object is to provide an improved three point suspension for a transmission, said suspension rigidly supporting one end of the transmission casing between a pair of longitudinally extending frame members and a single suspension connection positioned on the frame adjacent the other end of the transmission and connected thereto whereby a limited amount of twisting movement by the frame is compensated for in the construction of the transmission mounting means.

A more general object is the provision of a transmission mount which will support a transmission between the transverse frame members of a vehicle subject to grade, shock and twisting forces, the said mounting means permitting positive drive to the wheels of the vehicle while capable of absorbing such stresses and conditions which are encountered during the operation.

A still more specific object of the invention is to provide a three point suspension for a transmission, the said suspension or mounting means including a flexible mount permitting a limited amount of torsional and twisting movement of a transmission relative to the frame members to which it is connected.

These and further objects will become more readily apparent from a reading of the description when examined in connection with the accompanying sheets of drawings.

In the drawings:

Figure 1 is a side elevational view of an earth working machine including a two wheel tractor vehicle and a wheeled scraper bowl connected thereto;

Figure 2 is a plan view, partially schematic, showing a two wheel tractor and particularly frame portions and an improved mounting structure for supporting a transmission on the said frame;

Figure 3 is an enlarged side elevational view, partially in section, substantially taken along the line 3—3 of Figure 2;

Figure 4 is a cross sectional view taken along the line 4—4 of Figure 3;

Figure 5 is a side elevational view of the mounting means shown in Figure 4;

Figure 6 is a cross sectional view along the line 6—6 of Figure 5, and

Figure 7 is a cross sectional view taken substantially along the line 7—7 of Figure 6.

Referring now to Figure 1, an earth moving vehicle is generally designated by the reference character 10. The vehicle 10 comprises a two wheel tractor 11 connected to a scraper 12 in articulate relation. The tractor 11 includes a body 13 having a pair of ground wheels 14. An engine 15 is supported on the body 13 and is regulated from an operator's station designated at 16. The scraper 12 includes a bowl 17 supported at its rear end on a pair of ground wheels 18. A suitable draft structure 19 is pivotally connected to the two wheel tractor 11 in conventional fashion, the said structure 19 including side arms 20 which are suitably pivotally connected to the scraper bowl 17. The earth moving vehicle 10 may be of a conventional construction for heavy earth moving operations, the bawl being effective to load itself and to transport dirt from one location to another. Equipment of this type is subject to rugged terrain and great torsional stresses since it is utilized mostly off of the highway in the accomplishment of road building, etc. The tractor 11 and scraper 12 are positioned in conventional articulating relation and by suitable hydraulic cylinders (not shown) may be steered relative to each other, this latter structure not being pertinent from the standpoint of the invention.

As best shown in Figures 2 and 3 the body 13 includes a pair of longitudinally extending and transversely spaced frame members 21 which may be of suitable channel shaped construction. A differential casing 22 suitably supports the necessary elements for imparting drive to the ground wheels 14, the said casing 22 also serving as a transverse supporting member and being suitably rigidly connected to the transverse frame members 21. A transversely extending supporting member 23 is positioned forwardly of the casing 22 and is suitably connected to the frame members 21. Similarly a transversely extending support 24 is suitably rigidly connected to the frame members 21 at the rear portions thereof. As shown in Figures 2 and 3 stub axles 25 project outwardly from the casing 22 for driving the wheels 14.

A transmission is generally designated at 26 and includes a transmission casing 27. The transmission includes suitable transmission mechanism (not shown) which may be of varying types depending upon the type desired by the operator. The transmission casing 27 is also provided at its rear end with a transversely extending transfer case 28 also including suitable gearing (not shown) to provide for the transfer of power from the transmission. A power take-off housing 29 is positioned on top of the casing 27, the said power take-off housing 29 having an output member 30 projecting outwardly and rearwardly with respect thereto. The output member 30 is connected by means of a universal joint structure 31 to a drive member 32 in turn connected by means of a universal joint 33 to a power take-off shaft 34 which extends rearwardly and which may be suitably connected to a cable control unit (not shown) for operating control of the scraper. The transmission casing 27 is provided at its forward end with a collar 35.

As best shown in Figures 2 and 3, the frame members 21 support a pair of transversely spaced brackets 36 which may be suitably and rigidly connected to the frame members 21. A pair of connecting brackets 37 are connected to opposite sides of the rear portion of the casing 27 by means of bolts 38, the said brackets 37 also being rigidly secured to the brackets 36 by means of bolts and nuts 39. A driven member 40 projects outwardly from the casing 27. The driven member 40, by suitable transmission means (not shown) within the casing 27, and within the transfer case 28 suitably drives a stub shaft 40' projecting outwardly of the transfer case 28, the said shaft 40' being connected to a universal connection 41 in turn connected to a drive shaft 42. As best shown in Figure 2 the drive shaft 42, by means of a universal connection 43, is connected to a drive member 44 extending into the differential casing 22 and which by suitable differential means (not shown) within the casing 22 drives the axles 25 for imparting drive to the wheels 14.

Referring now particularly to Figures 2 and 3, the drive member 40 by means of a universal connection is operatively connected to a drive rod 46 which in turn is connected to a drive member 47 of the engine 15 as best shown in Figure 2.

The forward end of the casing 27 is supported on the differential casing 22 by means of a supporting structure generally designated at 48. The structure 48 comprises a bracket 49 of generally L-shaped design and having a transversely extending vertical plate 50 connected thereto. The said bracket 49 including side gussets 51 also suitably connected to support the plate in the position shown in Figures 3, 4 and 5. The bracket 48 is securely connected to the casing 22 by means of nuts and bolts 51'.

As best shown in Figures 4 and 5 a bracket or tension link 52 is provided with an upper opening 53 and a lower opening 54. A bolt 55 supports a ball type member 56, the said bolt extending through a bore 57 of the said member 56 as best shown in Figure 7. The ball type member 56 is provided at its opposite ends with shoulders 58 and 59, the shoulders 59, as shown in Figure 5, being in engagement with the head of the bolt 55. The plate 50 is also provided with an opening 60 through which the bolt 55 extends and upon the tightening of a nut 61 the shoulder 58 is tightened against the outer surface of the plate 50. The ball 56 is associated with a socket retainer 62 secured within the upper opening 53 of the bracket arm or hanger plate 52. The retainer 62 comprises annularly extending flanges 63 which are laterally spaced and project inwardly in a manner to provide a socket for the ball type member 56. The member 62 is provided with suitable packing material 64 and an annular nylon element 65 is centrally positioned, as shown in Figure 7, and circles the ball type member 56, the outer peripheral surface of the nylon element 65 being suitably secured within the retainer 62. The opening 54 supports an identical socket and retainer assembly 62 and in this case a bolt 66 extends through the bore 57 of the ball type bearing member 56, the shoulder 59 being tightened against a spacer 66' and the said bolt extending through an opening 68 in an arm 69. A nut 70 tightly secures the parts in assembly. The arm 69 extends vertically and includes a yoke member 71 which is split at its upper end as indicated at 72. The yoke 71 also includes integrally therewith adjacent the split, a pair of aligned integral connectors 73 and 74 having openings 75 in alignment. A bolt 76 extends through the openings and by means of a nut 77 the yoke 71 may be tightly secured about the collar 35.

As shown the supporting structure 48 with the brackets 36 and 37 provide a three point support or suspension for the casing 27. The arm 69 is a rigid arm relative to the casing 27 but at its lower end is adapted to move by means of the lower ball and socket pivotal connections 56 and 62 which also retain the transmission casing against longitudinal movement in cooperation with the brackets 36. The bracket 52 may pivot about a longitudinal axis by means of the upper ball type member 56 and retainer 62.

In the operation the vehicle is subjected to great stresses and torsional forces which may cause a certain amount of twisting of the frame members 21. During such twisting movement the casing 27 at its forward end may move to a limited degree laterally and swing by virtue of the pivotal connections afforded by the two ball and socket type connections 56 and 62. Any direct vertical components against the arm 69 are restrained by means of the member 52, though a limited flexing laterally is permitted by virtue of the structure disclosed. Thus the casing is firmly supported between the frame members 21 and yet the high stresses and torsional forces and components to which the tractor is subjected will not in any manner whatsoever break the connection or cause fracture of the casing 27 since sufficient flexibility to accommodate the twisting action is assured.

Thus maintenance problems with respect to the transmission mount are kept at a minimum. The objects of the invention have been fully achieved and it must be realized that modifications may be made which do not depart from the spirit of the invention as disclosed nor from the scope thereof as defined in the appended claims.

What is claimed is:

1. For a wheeled vehicle having a frame including a pair of transversely spaced longitudinal frame members, ground wheels on said frame, a power unit on said frame, a transmission including a casing positioned in laterally spaced relation between said frame members, a driven member on said transmission, a drive member on said power unit, a universal connection connecting said drive member with said driven member, and a drive means from said transmission to said ground wheels; a supporting structure for said transmission comprising a first pair of brackets rigidly connected to said frame members on opposite sides of said casing, means rigidly connecting said brackets to said casing, at a rear portion thereof, a transversely extending supporting member connecting said frame members forwardly of said casing, a second bracket connected to said transverse member below and in substantially vertical alignment with said universal connection, a vertical arm rigidly connected to said casing adjacent said universal connection and extending downwardly with respect thereto, a first ball type bearing member on said second bracket projecting toward said arm, a second ball type member on said arm below said first bearing member and projecting toward said second bracket, a tension link substantially parallel to said arm, and first and second vertically spaced resilient socket members on said link respectively pivotally engaged by said first and second ball type members to provide a flexible support between said frame and said casing.

2. For a wheeled vehicle having a frame including a pair of transversely spaced longitudinal frame members, ground wheels on said frame, a power unit on said frame, a transmission including a casing positioned in laterally spaced relation between said frame members, a driven member on said transmission, a drive member on said power unit, a universal connection connecting said drive member with said driven member, and a drive means from said transmission to said ground wheels; a supporting structure for said transmission comprising a first pair of brackets connected to said frame members on opposite sides of said casing, means connecting said brackets to said casing, a transversely extending supporting member connecting said frame members forwardly of said casing, a second bracket connected to said transverse member below said universal connection, a vertical arm rigidly connected to said casing, and extending downwardly, a first ball type bearing member on said second bracket projecting toward said arm, a second ball type member on said arm below said first bearing member and projecting toward said second bracket, a tension link substantially parallel to said arm, and first and second vertically spaced resilient socket members on said link respectively engaged by said first and second ball type members to provide a flexible support between said frame and said casing.

3. A supporting structure for a transmission including a casing, comprising a pair of transversely spaced longitudinal frame members, means supporting said casing on and between said frame members including a pair of brackets connected to said members, and to said casing adjacent one end portion thereof, a transverse support connected to said frame members, a bracket mounted on said transverse support, an upright arm rigidly connected to an opposite end portion of said casing and projecting downwardly with respect to its point of connection, a second bracket pivotally connected to said first bracket and projecting downwardly with respect to its point of connection and being disposed adjacent and substantially parallel to said arm, and means pivotally connecting said second bracket to said arm whereby said casing may have limited sideways movement relative to said frame.

4. A supporting structure in accordance with claim 3, said connection of said second bracket to said first bracket including a ball and socket.

5. A supporting structure in accordance with claim 4, said connection of said second bracket to said arm including a ball and socket.

6. A supporting structure in accordance with claim 4, said connection of said second bracket to said arm and said second bracket to said first bracket including balls and sockets.

References Cited in the file of this patent

UNITED STATES PATENTS

| | | |
|---|---|---|
| 1,336,008 | Whitten | Apr. 6, 1920 |
| 1,406,316 | Whitten | Feb. 14, 1922 |
| 1,635,213 | Holden | July 12, 1927 |
| 2,083,277 | Scott | June 8, 1937 |